ployacrylonitrile fiber of a denier of 1.5 to 5, although I am not to be understood as limiting my invention to these values, since fibers of higher or lower denier may be preferred for certain applications, such as the production of heavier or lighter battery separators. I prefer to have the fibers in the form of crimped staple of length from one-half to six inches, since these lengths are easily handled by the conventional equipment used to process textile staple into webs, batts, or fleeces. The fibers may be in the form of sliver, roving, tow, or any other continuous or discontinuous aggregate of fibers capable of being laid up into a coherent, self-sustaining web or batt.

3,092,519

BATTERY SEPARATOR
Arthur R. Olson, Walpole, Mass., assignor to The Kendall Company, Boston, Mass., a corporation of Massachusetts
No Drawing. Filed Mar. 17, 1961, Ser. No. 96,382
1 Claim. (Cl. 136—146)

This invention relates to a fibrous separator for use between the plates or elements of batteries, fuel cells, and the like. More particularly it relates to a separator in the form of a porous, low-density matrix of organic fibrous material which has exceptional thermal stability and resistance to attack by electrolytes, solvents, or inorganic catalytic salts in fused condition or in concentrated solution.

It is well known that in the operation of such devices as thermal batteries, certain types of fuel cells, and the like, a high operating temperature is desirable for the realization of greatest efficiency. This temperature requirement imposes severe demands on the material used for separators, spacers, catalyst carriers, or similar elements which are common components of such cells. One widely used type of mat, as these elements may generally be termed, comprises a batt or web of fibers, such as glass, asbestos, or vinyl fibers, which are chemically resistant, at least at normal temperatures, to the catalysts or electrolytes used in such cells. Other inorganic silicate fibers, of ceramic origin, have also been proposed.

There are, however, certain disadvantages inherent in the use of such prior art fibers. Inorganic silicate fibers in general are of high density, and are stiff and brittle. They resist forming into soft, porous, flexible mats which can be readily handled. If calendered and compressed they tend to fragment, due to the brittleness of the fibers. Moreover, in many applications, the polarity of the inorganic silicate fibers is believed to be detrimental to the realization of full cell efficiency. Finally, many inorganic fibers show an appreciable solubility in fused salt electrolytes, thus introducing contamination and undesirable side reactions.

On the other hand, natural and synthetic fibers, including vinyl fibers, have the advantage of being readily fabricated into self-sustaining webs or batts, or into non-woven fabrics, which can be manipulated, pressed, flexed, and cut to shape, and which have a loft and resilience which makes them very desirable for use as mats or separators. Additionally, the synthetic fibers can be prepared and used in a variety of deniers or fiber diameters, so that the pore size and porosity of non-woven fabrics or fibrous arrays consisting of synthetic fibers may be varied at will over a large range by judicious choice of fiber denier.

Unfortunately, however, fibers of this class are quite deficient in thermal resistance and in chemical resistance at elevated temperatures. It is well known that ordinary natural and synthetic organic fibers either melt, or char, or become drastically embrittled on prolonged exposure to temperatures over 200° C. This not only results in destruction of the mat, but introduces degradation products as contaminants which may severely decrease the functional efficiency of the cell.

I have found that it is possible to combine the desirable properties of an organic fiber batt—that is, loft, controlled low density, porosity and strength—with the thermal and chemical resistant nature of inorganic fibers. To do this, I unify a batt of certain acrylic fibers to form a coherent, self-sustaining structure strong enough to be handled, and without disturbing the unified arrangement of the fibers, I heat the unified array to bring about a profound alteration in the appearance and the properties of the array, as set forth more fully hereinbelow.

It is, therefore, an object of this invention to provide an organic fibrous separator for thermal batteries, fuel cells, and the like, said separator having exceptional resistance to thermal and chemical degradation.

It is a further object of this invention to provide a low-density battery separator of organic fibrous material which is thermally resistant, and yet possessed of sufficient strength to allow it to be shaped, handled, and flexed without mechanical failure due to embrittlement or loss of tensile strength.

It is a still further object of this invention to provide a thermally resistant organic fibrous assembly which has a controlled porosity which is relatively invariant over a wide temperature range.

It is also an object of this invention to provide a thermally resistant organic fibrous assembly which has substantial strength and integrity and which is substantially free from short fibers or cut fiber ends or lint.

These and other objects of the invention I accomplish by the following procedure.

A prefered starting material for the practise of this invention is polyacrylonitrile fiber such as is sold under the trademark "Orlon" or under the trademark "Acrilan." Other acrylic fibers may be used, or I may employ fibrous copolymers in which the acrylonitrile is copolymerized with a minor amount of other polymerizable substance, as in Dynel fiber, which is a Union Carbide trademark.

It has been found that if fibers of this type are heated to 250° C. for 24 hours, or to 200° C. for 48 hours, preferably in the presence of air, a profound change takes place. The fibers turn black, but are not completely degraded in tensile strength as might be expected. In this process, which has been interpreted as a possible cyclization and dehydrogenation of the original polyacrylonitrile fiber, the heat-treated fiber develops a greatly enhanced resistance to the degrading effects of elevated temperatures. In fact, the fiber no longer supports combustion, and glows without burning in a Bunsen burner flame. This resistance to temperature is especially marked for short-term, very high temperature exposure, the fibers being able to resist short-term exposures to 900°–1000° C.

The cyclizing heat treatment which imparts subsequent temperature resistance, however, also imparts a certain degree of brittleness to the fibers. In fact, the black fibers cannot be spun into yarns or even carded without considerable waste, dust, and fly, due to fiber breakage due to brittleness. This unfortunate property militates against the use of such fibers in bonded webs or non-woven fabrics, where the operations of carding, pressing, bonding and so on are such as to break a substantial proportion of the black fibers and result in a weak or substandard mat.

I have found that if untreated Orlon fibers are first carded or otherwise formed into a fleece or web, and this fleece is then unified by suitable techniques, the mat thus formed may be heat-treated with the fibers in situ, so as to speak, with the result that an integrated and unified mat results from which battery spacers and the like, of various shapes and sizes, may be cut. By forming and treating a batt of acrylic fibers in this way, I avoid the necessity of processing treated fibers on textile equipment, so that my product has all the advantages of the thermal and chemical resistance of heat-treated polyacrylonitrile fibers, but is not contaminated by the presence of short broken fibers or fiber ends which characterize a mat made by processing pre-treated fibers through the conventional equipment used to produce non-woven fabrics.

In practicing my invention, I prefer to employ polyacrylonitrile fibers of textile length, which are processed to form a batt, or web, or a layered series of superimposed webs, on conventional textile fiber processing equipment such as cards, garnetts, or fiber air-lay devices. For the purpose of unifying such a loose array into a coherent mat which can be handled readily, I prefer to use a felting process such as is carried out by a needle loom apparatus. In a needle loom, the fibers in groups or clumps are forced from a generally planar or overlapping layered relation into an intermingled and interlocked relation, providing a low-density, coherent, soft felt which can be readily handled through the heat-treating process.

Since the cyclizing process is exothermic, care must be taken to prevent too close packing of the mat of acrylic fiber in the conversion process. For controllable results, I prefer to employ a continuous heating process, with a continuous length of felted fiber passing through an oven heated to 200°–300° C., the exposure time being 24 hours or more at 200°, or 2 hours or more at 250° C.

Alternatively, cut pieces of the felted fibrous array may be treated individually in an oven at 200°–300° C. for 2 hours or more. However, this alternative process has two disadvantages. First, the molecular rearranging process is accompanied by an area shrinkage of 25% or more in the fibrous felt, the degree of shrinkage apparently depending on the degree to which the fibers have been felted. Heavier, denser felts show higher shrinkage effects. Second, considerable care must be exercised in the manner in which the cut pieces are stacked or arrayed in the treating oven, otherwise the heat evolved in the exothermic reaction may not be dissipated readily enough to prevent charring. For these reasons, a continuous heating process is preferable.

The product of this process is a felt-like matrix of thermally resistant jet-black fibers substantially free from broken fiber ends and fibrous particles. It has excellent dimensional stability, and in addition to the thermal resistance mentioned above, it is characterized by unusual solvent resistance, being insoluble in many reagents which are good solvents for the unconverted polyacrylonitrile.

As alternative methods for carrying out this process, I may also unify a batt of acrylic fibers by techniques other than by a needle loom. If ordinary binders in fiber, powder, or latex form are used, the result is usually a more dense and compacted mat, from which the binder is subsequently burned off in the heat treatment. In general, the products of this process are weaker, due to the substantially complete removal of bonding agent during thermal conversion, and such mats may necessitate careful conveying of the material through the heating oven.

In general, a high porosity, low density product is most desirable. Porosity can be controlled to some extent by the degree of needling to which the batt is subjected and also by the choice of fiber denier. For very low density mats, the polyacrylonitrile fiber may be carded with a suitable percentage of a diluent fiber such as cotton or rayon, after which the fiber mixture is suitably unified. Thermal conversion of the mixed fiber mat will then burn off or degrade completely the diluent cotton or rayon fiber: the residual ash, if any, can be removed from the mat by vacuum techniques or by gentle rinsing in an acid solution, to which the low-density converted mat is insensitive.

The following examples will serve to illustrate the manner in which this invention may be practised.

*Example I*

A web of Orlon fibers of 3 denier 1½″ staple length was made by passing the fibers through an air lay machine which deposited the fibers in a randomly oriented batt weighing 120 grams per square yard. This randomly oriented batt was then passed through a conventional needle loom at a punching density of approximately 400 punches per square inch. The resulting 80 grams per square yard Orlon felt was cut into 8 inch squares which were placed in a standard laboratory air oven at 200° C. for 48 hours. The resulting product, black in color, is used in a thermal fuel cell where it is saturated with fused $Li_2CO_3$—$K_2CO_3$ electrolyte.

*Example II*

A card web of Acrilan fiber of 3 denier 1½″ staple length is felted similarly to Example I. It is then bonded in a conventional manner with a polyvinyl acetate emulsion. By this means the thickness is decreased and the apparent density is increased and the pore size decreased. This product was heated in a vacuum oven at 250° C. for 24 hours. The resulting product showed the typical black fibers of the cyclized arrangement plus decomposition products from the polyvinyl acetate. The decomposition products were burned off by flaming the product, and a high-temperature resistant separator material resulted.

Although the present invention has been described chiefly in terms of a battery separator, other analagous uses will readily suggest themselves to those skilled in the art. The product of this invention may be impregnated with substances such as molten salts, which after cooling tend to form a brittle cake if unsupported. The support offered by the fibrous product of this invention greatly enhances the mechanical strength of such a cake. Similarly, the product of this invention makes an excellent carrier or reservoir for ion-exchange resins, particularly at elevated temperatures.

Having thus described my invention, I claim:

In a battery having an anode, a cathode, an electrolyte and a separator, said separator being thermally and chemically resistant to degradation in the presence of said electrolyte, said separator comprising a unified non-woven fibrous felt of polyacrylonitrile fibers assembled in planar overlapping relation and intermingled and interlocked to provide a low density coherent, soft felt, said felt having been heat treated at a temperature in excess of 200° C. but below the charring temperature of the fiber for a period of at least about two hours.

References Cited in the file of this patent

UNITED STATES PATENTS 2,913,802    Barnett _____ Nov. 24, 1959